United States Patent [19]

Yoshino

[11] Patent Number: 5,111,307
[45] Date of Patent: May 5, 1992

[54] FACSIMILE MACHINE
[75] Inventor: Motoaki Yoshino, Kawasaki, Japan
[73] Assignee: Canon Kabushiki Kaisha, Tokyo, Japan
[21] Appl. No.: 451,185
[22] Filed: Dec. 15, 1989
[30] Foreign Application Priority Data Dec. 19, 1988 [JP] Japan .................................. 63-320201

[51] Int. Cl.⁵ .............................................. H04N 1/00
[52] U.S. Cl. .................................... 358/407; 358/400; 358/434
[58] Field of Search ............... 358/403, 406, 407, 434, 358/438, 436, 439, 400, 401, 402, 435, 468, 444

[56] References Cited

U.S. PATENT DOCUMENTS

| | | | |
|---|---|---|---|
| 4,000,371 | 12/1976 | Ogawa | 358/435 |
| 4,549,219 | 10/1985 | Sue et al. | 358/438 |
| 4,642,697 | 2/1987 | Wada | 358/439 |
| 4,677,492 | 6/1987 | Fellerer | 358/438 |
| 4,772,955 | 9/1988 | Kurahayashi et al. | 358/426 |
| 4,785,355 | 11/1988 | Matsumoto | 355/132 |
| 4,789,900 | 12/1988 | Takahashi | 358/439 |
| 4,814,894 | 3/1989 | Yoshida | 358/451 |
| 4,839,737 | 6/1989 | Saito | 358/406 |
| 4,845,569 | 7/1989 | Kurahayashi et al. | 358/400 |
| 4,974,097 | 11/1990 | Kaneko et al. | 358/400 |

Primary Examiner—Edward L. Coles, Sr.
Assistant Examiner—Thomas D. Lee
Attorney, Agent, or Firm—Fitzpatrick, Cella Harper & Scinto

[57] ABSTRACT

A facsimile machine having a relay function declares a width of a loaded record sheet as a maximum receivable scan line length when a call is received, and redeclares a relayable document sheet width as the maximum receivable scan line length when a relay request is received.

6 Claims, 3 Drawing Sheets

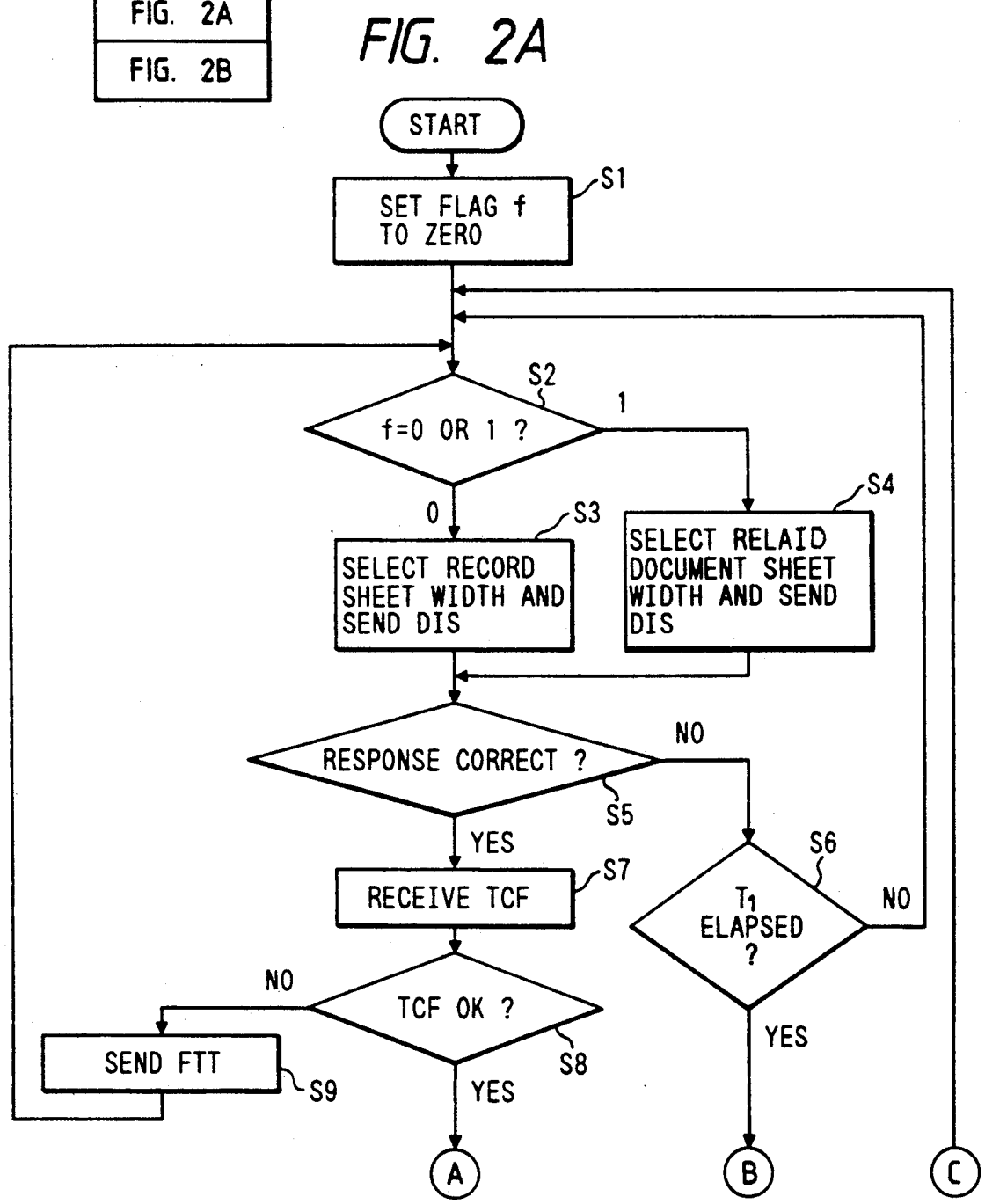

FACSIMILE MACHINE

BACKGROUND OF THE INVENTION

1. Field of the Invention

The present invention relates to a facsimile machine having a relay function to send a received image to another machine.

2. Related Background Art

In a prior art facsimile machine having a relay function, for example, in a CCITT standard G3 facsimile machine, a maximum receivable scan line length is declared in a DIS (digital identification signal for indicating a receiving capability) by a width of a loaded record sheet or a maximum relayable document sheet width.

Examples of patent applications relating to the facsimile machine having the relay function are U.S. patent application Ser. Nos. 813,514 (Dec. 26, 1985) and 120,104 (Nov. 13, 1987). An example of the patent application relating to the declaration of receivable size in a memory receive mode is U.S. Pat. application Ser. No. 024,521 (Mar. 11, 1987).

In the above applications, however, the maximum receivable scan line length is fixedly declared in the DIS based on the constant information. Accordingly, the following problems are encountered.

First, in declaring the width of the loaded record sheet, if a size A4 record sheet has been loaded in the relay machine and a relay requesting station which is capable of sending a size B4 document sheet is to send the size B4 document sheet to a grandchild station which is capable of receiving the size B4 document sheet, the size B4 document sheet is reduced to the size A4 document by the sending station in relay request transmission. As a result, an image quality of the original document is degraded.

Further, in declaring the maximum relayable document sheet width, if the maximum relayable width is the size B4 and the loaded record sheet is the size A4, and if the relay station is to receive the size B4 document sheet by itself instead of relaying it, it is necessary to reduce the size B4 to the size A4 in an output stage. Accordingly, it is necessary to provide a recorder having a reducing function.

SUMMARY OF THE INVENTION

It is an object of the present invention to improve a facsimile machine to avoid the above problems.

It is another object of the present invention to provide a facsimile machine which can prevent the degradation of image quality due to the reduction of image in a relay sending mode.

It is another object of the present invention to provide a facsimile machine which declares a recordable size to a calling station in a normal receive mode, and declares a maximum receivable size to the calling station in a relay mode.

It is another object of the present invention to provide a facsimile machine which permits to switch the receivable image size between the normal receive mode and the relay mode.

Other objects of the present invention will be apparent from the following detailed description of the preferred embodiments and the accompanying drawings.

BRIEF DESCRIPTION OF THE DRAWINGS

FIGS. 2A and 2B show a flow chart of a receiving operation in a relay machine in relay request reception.

DESCRIPTION OF THE PREFERRED EMBODIMENTS

One embodiment of the present invention is now explained in detail with reference to the drawings.

In the following embodiment, a CCITT standard G3 facsimile machine is explained although the present invention is applicable to not only the G3 facsimile machine but also various other facsimile machines such as G2 and G4.

Figure 1:
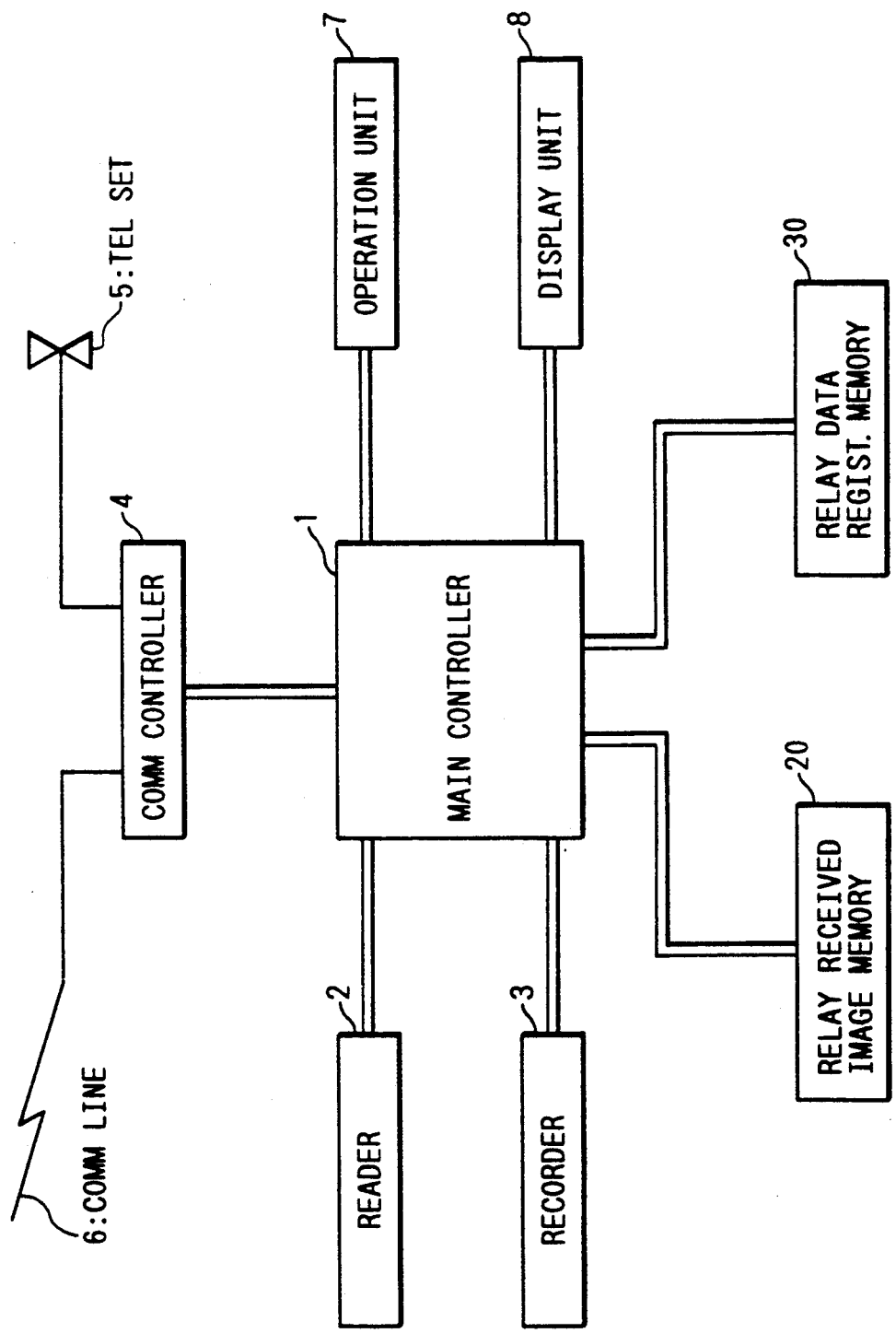
FIG. 1 shows a block diagram of one embodiment of the present invention.

FIG. 1 shows a block diagram of one embodiment of the facsimile machine of the present invention.

The facsimile machine comprises a main controller 1, a reader 2, a recorder 3, a communication controller 4, a telephone set 5, a console unit (operation unit) 7, a display unit 8 and memories 20 and 30.

The main controller 1 controls the overall operation and comprises a microprocessor, a program memory (ROM) a work area memory (RAM), and so on.

The reader 2 comprises a CCD image sensor, a document sheet feeder, etc. and reads the document sheet.

The recorder 3 comprises a thermal printer a laser beam printer, etc. and outputs an image on a record sheet.

The communication controller 4 comprises a modem, an NCU, etc. and a communication line 6 and the telephone set 5 are connected thereto.

The console unit 7 comprises a keyboard, and is used to set a mode and input an address.

The display unit 8 comprises an LED (light emitting diode), LCD (liquid crystal display) or the like, and displays numerals and messages.

The memory 20 is for a relaying received image. It stores compressed received image data as well as information necessary for relaying such as scan line length and line density.

The memory 30 is for registering relay data. It stores telephone numbers of sending stations which have been permitted for relay request and telephone numbers of relay destination stations, in a predetermined format.

Figure 2B:
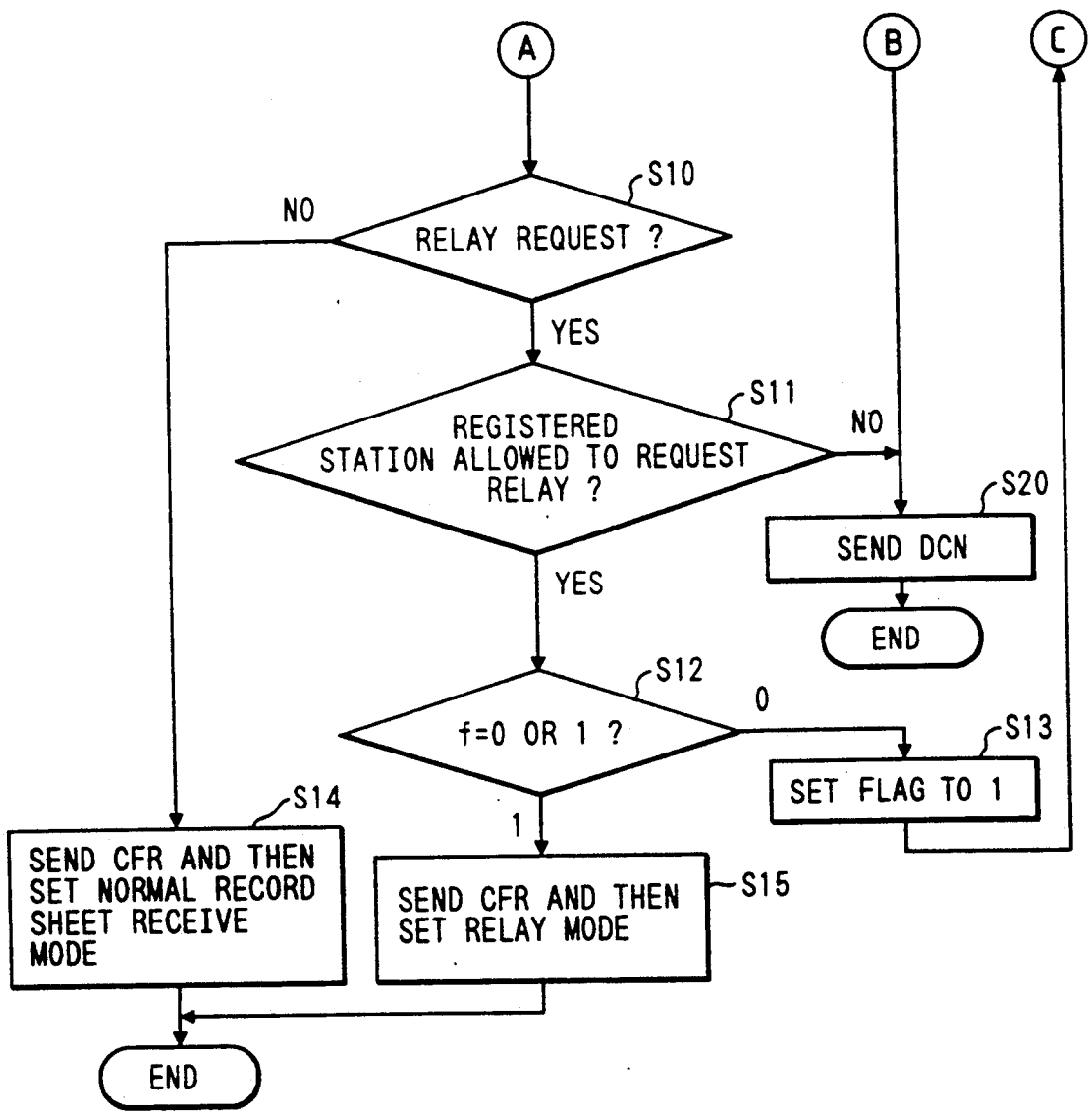

FIG. 2 shows a flow chart of a receiving operation of a relay machine when a relay request is received.

When a call is received, a relay request flag f in the RAM is cleared (step S1). The relay request flag f is referred (step S2). If the flag f = 0, it means that the relay request has not been received, and the width of the loaded record sheet is set as the receivable scan line length (size) and the DIS is sent out (step S3). If the flag f = 1, it means that the relay request has been received, and the relayable document sheet width is set as the receivable scan line length (size) and the DIS is sent out (step 4).

Then, the response to the DIS (a digital command signal DCS for designating a send mode from the calling station) is received (step S5). If a correct response is not received (if DCS is not received), the elapse of an initial identification time $T_1$ is checked (step S6), and if the initial identification time $T_1$ has not been elapsed, the process returns to the step S2 to resend DIS. If the initial identification time $T_1$ has been elapsed, a DCN (disconnection command signal) is sent and the line is disconnected (step S20).

If the DCS is received as the response, a TCF (training check signal) is received (step S7) and the content thereof is checked (step S8).

If the TCF is not good, an FTT (training failure signal) is sent (step S9) and the process returns to the step S2 to resend the DIS.

If the TCF is good, the contents of an NSS (non-standard function setting signal) and a TSI (transmitting terminal identification signal) which were sent with the DCS are checked.

Whether the relay request bit of the NSS has been set or not is checked to determine whether the relay request has been issued or not (step S10). If the relay request has not been issued, a CFR (confirmation of ready to receive) is sent and the normal record sheet receiving mode is set (step S14).

If the relay request has been issued in the step S10, whether the telephone number in the TSI is the telephone number of the sending station permitted for the relay request, registered in the relay data registration memory 20 (step S11). If the corresponding telephone number is not found in the relay data registration memory 20, the DCN is sent out and the line is disconnected (step S20).

If the corresponding telephone number is found in the relay data registration memory 20, it means that the sending station is capable of relaying, and the flag f is checked (step S12). If the flag f=1, the CFR is sent out because the relayable document sheet width has already been informed to the sending machine, and the memory receive mode for the relaying is set (step S15). If the flag f=0, the relay request flag f is set to "1" (step S13) and the process returns to the step S2 to resend the DIS having the information of the relayable document sheet size set therein in the step S4. The initial identification time $T_1$ is reset.

In the present embodiment, the maximum relayable scan line length is informed to the sending machine by resending the DIS. Alternatively, the width of the loaded record sheet may be informed by the DIS as the maximum receivable scan line length, and the maximum relayable document sheet width may be informed by an NSF (non-standard receiving function signal).

The relayable document sheet size by the setting of the flag f is determined by the memory capacity of the memory 20. If the memory 20 can store the size A3 image data, the information of the size A3 is set in the DIS, and if the memory 20 can store the size B4 image data, the information of the size B4 is set in the DIS. On the other hand, the receivable document sheet size by the resetting of the flag f is determined by the size of the record sheet loaded in the recorder 3. If the record sheet size is A4, the information of the size A4 is set in the DIS, and if the record sheet size is B4, the information of the size B4 is set in the DIS.

In this manner, different receivable image sizes may be declared to the calling station in the normal receive mode and the relay mode. Thus, if the image size storable in the memory 20 is the size A3, the degradation of the image quality due to the reduction of the image is prevented.

The present invention is not limited to the above embodiment but various modifications thereof may be made.

I claim:

1. A facsimile machine comprising:
   means for declaring a processable image size to a calling station;
   means for receiving image data from the calling station;
   relay means for sending the received image data received by said receiving means to another station;
   record means for recording the received image data received by said receiving means; and
   control means connected to said declaring means for changing the declaration of the processable image size to the calling station between a size for a received image record mode and a size for a received image relay mode,
   wherein said control means determines a presence or absence of information indicating a relay request from the calling station, and changes the declaration of the image size in accordance with the determination result.

2. A facsimile machine according to claim 1 wherein said control means declares a recordable image size in the record mode.

3. A facsimile machine according to claim 1 wherein said control means declares a receivable image size in the relay mode.

4. A facsimile machine according to claim 1, wherein said control means determines a record sheet size of said record means, and declares the image size in the record mode in accordance with the determination result.

5. A facsimile apparatus having a relay mode for transmitting received image data to another station and a record mode for recording the received image data, comprising:
   means for declaring a processable image size to a calling station;
   control means for determining whether or not information indicating a relay request is transmitted from the calling station, and for changing the declaration of an image size by said declaration means in accordance with the determination result.

6. A facsimile apparatus having a relay mode for transmitting received image data to another station and a record mode for recording the received image data, comprising:
   means for transmitting information on a receiving ability including information on a processable image size;
   control means for determining whether or not information indicating a relay request is received, and for changing the information on a processable image size transmitted by said transmitting means in accordance with the determination result.

* * * * *